(12) United States Patent
Aoki et al.

(10) Patent No.: US 8,967,818 B2
(45) Date of Patent: Mar. 3, 2015

(54) FLUORESCENT SCREEN AND IMAGE DISPLAY DEVICE PROVIDED WITH SAME

(75) Inventors: Kazuhiko Aoki, Tokyo (JP); Masahiko Ohta, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/126,380

(22) PCT Filed: May 28, 2012

(86) PCT No.: PCT/JP2012/063676
§ 371 (c)(1),
(2), (4) Date: Dec. 13, 2013

(87) PCT Pub. No.: WO2012/176585
PCT Pub. Date: Dec. 27, 2012

(65) Prior Publication Data
US 2014/0118988 A1    May 1, 2014

(30) Foreign Application Priority Data
Jun. 20, 2011   (JP) ................... 2011-136178

(51) Int. Cl.
*F21V 9/14*     (2006.01)
*G02B 5/30*     (2006.01)
*G02B 27/28*    (2006.01)
*G03B 21/60*    (2014.01)

(52) U.S. Cl.
CPC ........... *G02B 5/3083* (2013.01); *G02B 27/283* (2013.01); *G03B 21/60* (2013.01); *F21V 9/14* (2013.01); *G02B 2207/113* (2013.01)
USPC ............................... 362/19; 362/260

(58) Field of Classification Search
USPC ................................ 362/19, 260
See application file for complete search history.

(56) References Cited

U.S. PATENT DOCUMENTS 6,586,874 B1    7/2003   Komoto et al.

FOREIGN PATENT DOCUMENTS

| JP | 10-319877 | 12/1998 |
| JP | 2007-033813 | 2/2007 |
| JP | 2008-170674 | 7/2008 |
| JP | 2008-538145 | 10/2008 |

OTHER PUBLICATIONS

International Search Report corresponding to PCT/JP2012/063676, dated Jun. 22, 2012, 5 pages.

*Primary Examiner* — Mary Ellen Bowman
(74) *Attorney, Agent, or Firm* — Wilmer Cutler Pickering Hale and Dorr LLP

(57) ABSTRACT

A fluorescent screen includes phosphor regions 1-R, 1-G, diffusion region 1-B and reflecting means 10 formed on a region that includes phosphor regions 1-R and 1-G and diffusion region 1-B. Reflecting means 10 includes fluorescent light reflecting layer 11, phase difference layer 12, and polarizing layer 13 deposited in that order. Fluorescent light reflecting layer 11 transmits excited light 4 and reflects fluorescent light from phosphor regions 1-R and 1-G. Polarizing layer 13 both transmits excited light 4 and, of diffused light of the excited light (4) that was entered from diffusion region 1_B through Phase difference layer 12, transmits TM polarized light and reflects TE polarized light.

10 Claims, 7 Drawing Sheets

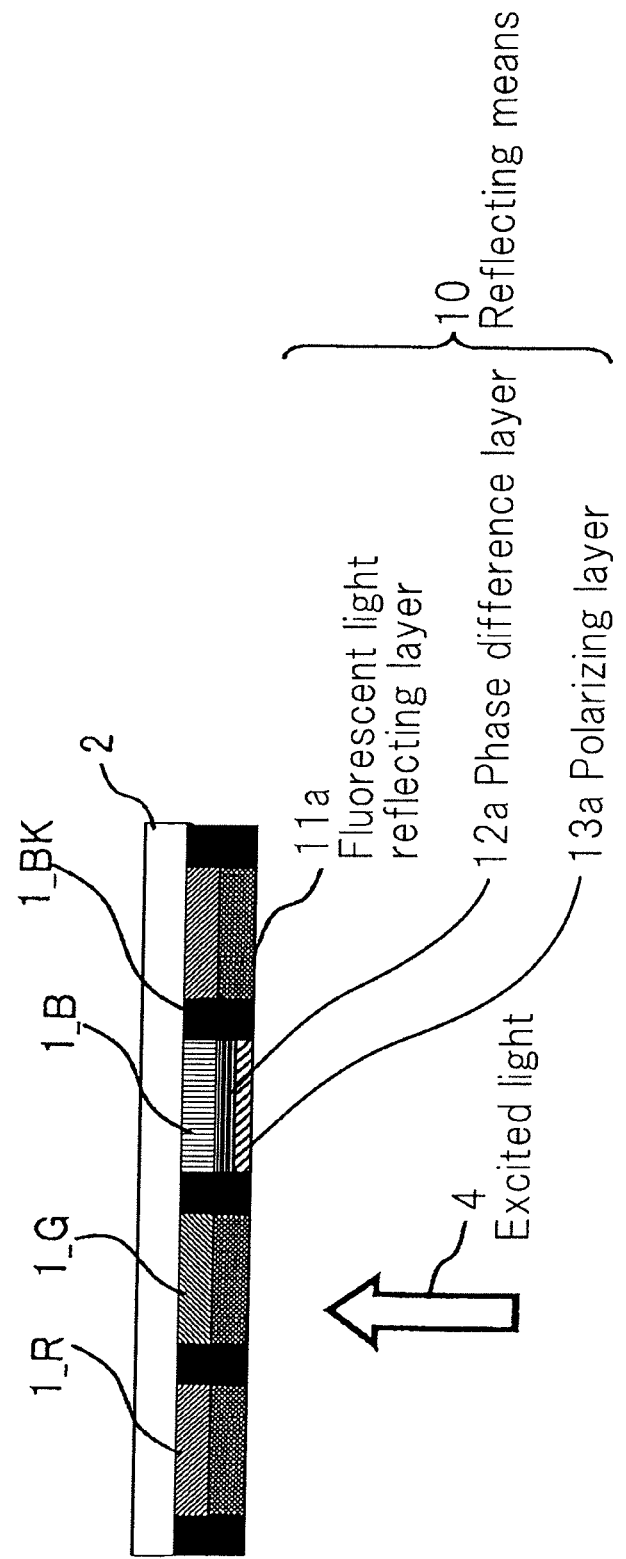

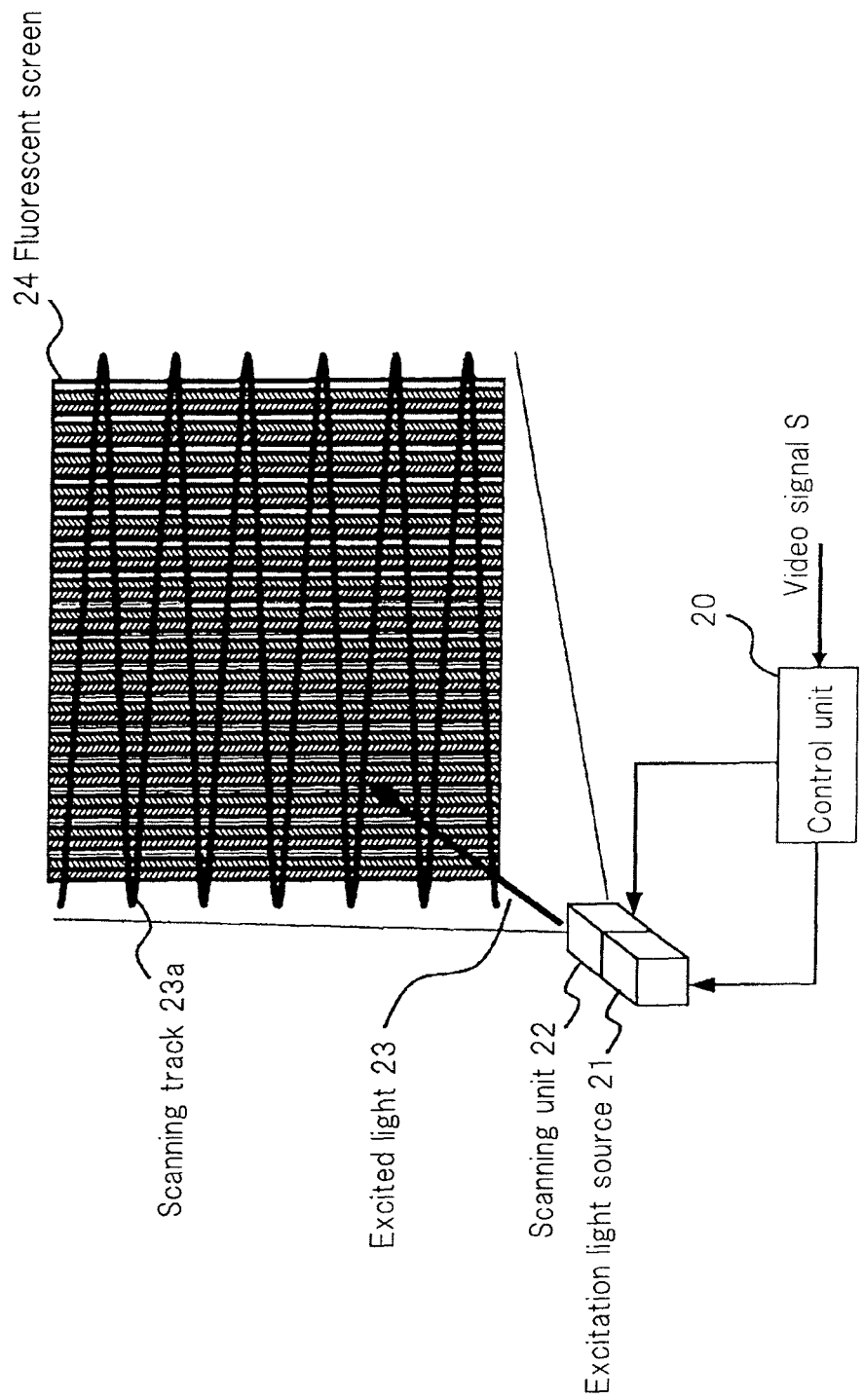

FLUORESCENT SCREEN AND IMAGE DISPLAY DEVICE PROVIDED WITH SAME

Cross-Reference To Related Applications

This application is a national stage application of International Application No. PCT/JP2012/063676 entitled "Fluorescent Screen and Image Display Device Provided with Same," filed on May 28, 2012, which claims the benefit of the priority of Japanese Patent Application No. 2011-136178, filed on Jun. 20, 2011, the disclosures of each of which are hereby incorporated by reference in their entirety.

TECHNICAL FIELD

The present invention relates to a fluorescent screen in which phosphor regions that contain a fluorescent material that absorbs excited light to emit fluorescent light (visible light) and diffusion regions that receive excited light to supply diffused light are periodically arranged in the in-plane direction, and relates to an image display device that is provided with this fluorescent screen.

BACKGROUND ART

Patent Document 1 discloses a display device that is provided with a fluorescent screen and means for scanning the fluorescent screen with blue excited light to form an image.

The fluorescent screen is provided with first phosphor regions that contain a fluorescent material that absorbs excited light to emit red fluorescent light, second phosphor regions that contain a fluorescent material that absorbs excited light to emit green fluorescent light, and non-fluorescent regions that diffuse excited light to supply blue diffused light, and these regions are arranged periodically in the in-plane direction.

In the above-described display device, excited light is irradiated from one surface (rear-surface side) of the fluorescent screen, and images are observed from the other surface (front-surface side) of the fluorescent screen.

When the spatial angular distribution (which corresponds to the view angle) of light that is emitted from each region of the first and second fluorescent regions and the non-fluorescent regions is small, the problem of view angle dependency arises, i.e., the perceived contrast ratio or color varies according to the direction (angle) of viewing a displayed image.

In the device described in Patent Document 1, a fluorescent material that absorbs excited light in the first and second fluorescent regions releases fluorescent light radially, and this released fluorescent light is diffused equally in all directions. The diffusion in all directions of this fluorescent light is referred to as isotropic diffusion. The non-fluorescent region is also configured to diffuse diffused blue light equally in all directions.

Configuring each of the first and second fluorescent regions and the non-fluorescent regions to produce isotropic diffusion enables an increase in the spatial angular distribution (view angle) of light that is emitted from these regions and enables a solution to the problem of view angle dependency.

However, when each of the first and second fluorescent regions and the non-fluorescent regions are configured to produce isotropic diffusion, diffused light in each region is exited in both the direction toward the front surface and the direction toward the rear surface. In this case, the diffused light that is exited toward the rear surface does not contribute to the formation of images and therefore decreases the light utilization efficiency.

In the device described in Patent Document 1, a reflection layer is provided on the rear surface of the fluorescent screen that transmits blue excited light and reflects light of other colors (including red and green fluorescent light).

The reflection layer is a wavelength-selective reflection layer that is made up of, for example, a dielectric multilayer film. The red and green fluorescent light that is emitted toward the rear surface from the first and second fluorescent regions is reflected in the direction toward the front surface by the reflection layer, whereby the light utilization efficiency of fluorescent light can be increased.

CITATION LIST

Patent Documents

Patent Document 1: Japanese Unexamined Patent Application Publication No. 2008-538145

SUMMARY OF THE INVENTION

However, in the display device described in Patent Document 1, although the red and green fluorescent light that is emitted toward the rear surface from the first and second fluorescent regions is reflected in the direction toward the front surface by the reflection layer, the blue diffused light that is exited toward the rear surface from the non-fluorescent regions is transmitted through the reflection layer. The blue diffused light that is transmitted through the reflection layer does not contribute to the formation of images, whereby the light utilization efficiency of blue light decreases.

It is therefore an object of the present invention to provide a fluorescent screen and an image display device that uses this fluorescent screen that can raise the light utilization efficiency not only for fluorescent light but also for the diffused light of excited light and thus solve the above-described problem.

The fluorescent screen of the present invention for achieving the above-described object is a fluorescent screen that is equipped with phosphor regions that contain fluorescent material that absorbs first linearly polarized light and emits fluorescent light and diffusion regions that diffuse the first linearly polarized light and includes:

a polarizing layer that is arranged on the side of the diffusion regions into which the first linearly polarized light is irradiated;

wherein the polarizing layer transmits the first linearly polarized light and reflects second linearly polarized light whose vibrational direction differs from that of the first linearly polarized light.

The image display device of the present invention includes:

the above-described fluorescent screen;

an excited light source that supplies first linearly polarized light; and a scanning unit that scans one surface of the fluorescent screen with the first linearly polarized light that is supplied from the excited light source.

BRIEF DESCRIPTION OF THE DRAWINGS

FIG. 8 is a schematic sectional view that shows the cross-section construction of a portion of the fluorescent screen that is the fifth exemplary embodiment of the present invention.

FIG. 9 is a block diagram showing an example of a projection-type image display device that is provided with the fluorescent screen of the present invention.

| Explanation of Reference Numbers | |
|---|---|
| 1_R, 1_G | phosphor region |
| 1_B | diffusion region |
| 1_BK | black stripe |
| 2 | base material |
| 10 | reflecting means |
| 11 | fluorescent light reflecting layer |
| 12 | phase difference layer |
| 13 | polarizing layer |

DESCRIPTION OF EMBODIMENTS

Exemplary embodiments of the present invention are next described with reference to the accompanying drawings.
First Exemplary Embodiment FIG. 1 is a schematic sectional view showing the cross-section construction of a portion of the fluorescent screen that is the first exemplary embodiment of the present invention.

Figure 1:
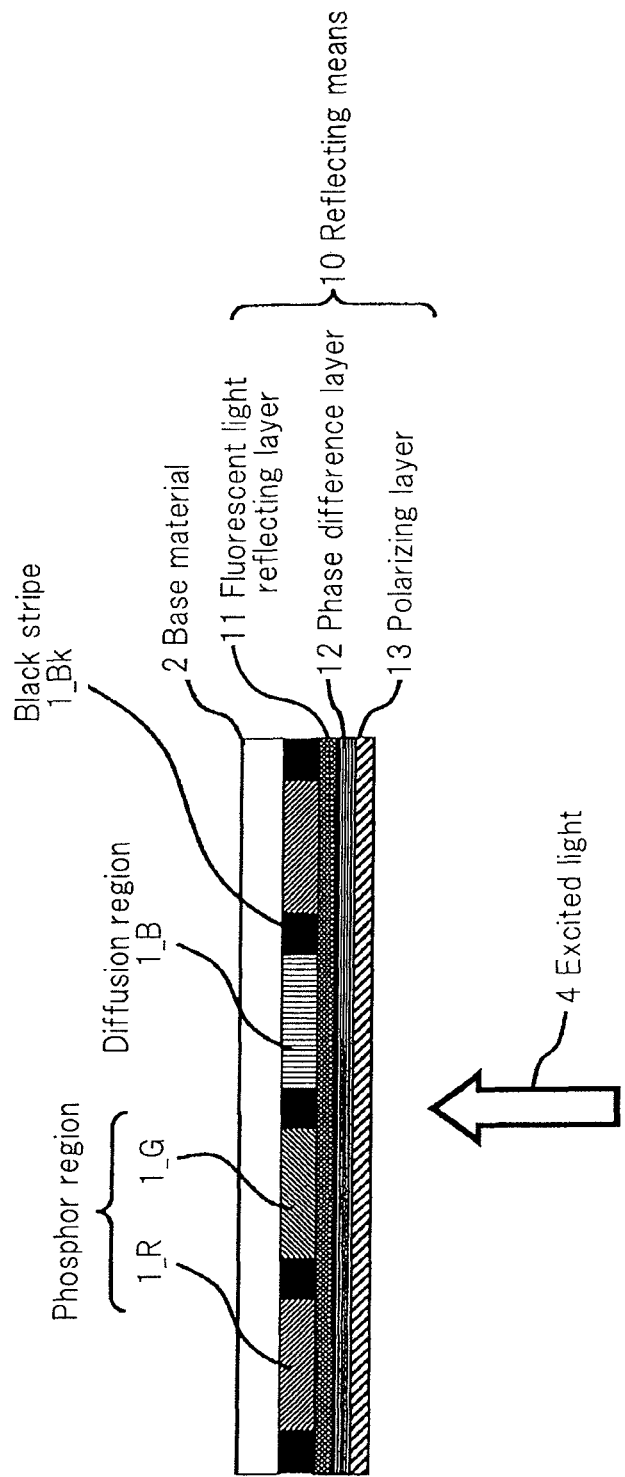
FIG. 1 is a schematic sectional view that shows the cross-section construction of a portion of the fluorescent screen that is the first exemplary embodiment of the present invention.

Referring to FIG. 1, the fluorescent screen is a component that is used in rear-projection-type image display devices and includes: base material 2, phosphor regions 1_R and 1_G, diffusion region 1_B, black stripe 1_BK, and reflecting means 10.

Base material 2 has spectral transmission characteristics whereby light of a wavelength band that includes at least red, green, and blue light is transmitted. Base material 2 is formed by, for example, acryl (refractive index n=1.49), and its thickness is appropriately set to the range of, for example, several tens of μm to several 100 μm.

Phosphor regions 1_R and 1_G, diffusion region 1_B, and black stripe 1_BK are formed on one surface of base material 2. Black stripe 1_BK is composed of an absorbing material that absorbs excited light 4 and fluorescent light of each of the colors that are emitted from phosphor regions 1_R and 1_G.

Phosphor regions 1_R and 1_G and diffusion region 1_B are arranged periodically in the in-plane direction, and black stripes 1_BK are formed in regions that are between phosphor regions 1_R and 1_G and diffusion region 1_B. In other words, phosphor regions 1_R and 1_G and diffusion regions 1_B are regions that are partitioned in stripe form or matrix form by black stripes 1_BK

Phosphor region 1_R contains a phosphor that absorbs blue excited light 4 to emit red fluorescent light. Phosphor region 1_G contains a phosphor that absorbs excited light 4 to emit green fluorescent light. In phosphor regions 1_R and 1_G, the phosphor that absorbs excited light 4 releases fluorescent light radially, and this released fluorescent light diffuses equally in all directions (isotropic diffusion).

Diffusion region 1_B diffuses excited light 4, and being a region that emits blue diffused light, maintains the polarization of the incident light. This diffusion region 1_B that maintains polarization can be constituted by ground glass or a holographic optical element. For example, a diffusion region that maintains polarization is obtained by applying an acryl resin to the base material and then, after thermo-setting or photosetting, grinding the surface (for example, a process of grinding in one direction or in the vertical and horizontal directions). Alternatively, a diffusion region that maintains polarization is obtained by applying a resin such as acryl to the base material and then forming a distinctive hologram pattern (a collection of minute uneven trough surfaces) on the surface by means of nano-imprinting.

In diffusion region 1_B, blue diffused light is diffused equally in all directions. The spatial angular distribution (view angle) of diffused light that is exited from diffusion region 1_B substantially matches the spatial angular distribution (view angle) of fluorescent light that is emitted from phosphor regions 1_R and 1_G.

In the example shown in FIG. 1, phosphor regions 1_R and 1_G and diffusion regions 1_B are formed periodically in a specific direction and in a predetermined order.

Reflecting means 10 is provided on the surface of base material 2 on which phosphor regions 1_R and 1_G, diffusion regions 113, and black stripes 1_BK are formed. Reflecting means 10 includes fluorescent light reflecting layer 11, phase difference layer 12, and polarizing layer 13.

Fluorescent light reflecting layer 11, phase difference layer 12, and polarizing layer 13 are deposited from the base-material-2 side in that order.

Fluorescent light reflecting layer 11 has spectral transmission characteristics whereby at least blue excited light 4 is transmitted and red and green fluorescent light that is emitted from phosphor regions 1_R and 1_G is reflected, and is composed of, for example, a dielectric multilayer film. A dielectric multilayer film is a film in which at least two dielectric films having different refractive indices are alternately deposited, the spectral transmission characteristics of the film being determined by the film thickness and refractive index of each dielectric film.

Phase difference layer 12 gives a predetermined phase difference between first and second linearly polarized light that vibrate in mutually perpendicular directions. Here, first linearly polarized light is TM (Transverse Magnetic Wave) polarized light or P-polarized light. Second linearly polarized light is TE (Transverse Electric Wave) polarized light or S-polarized light.

Phase difference layer 12 is composed of, for example, a quarter-wave plate. λ is the wavelength of excited light 4. In this case, the quarter-wave plate converts each of the first linearly polarized light (TM polarized light or P-polarized light) and the second linearly polarized light (TE polarized light or S-polarized light) that are entered from the polarizing-layer-13 side to circularly polarized light and converts circularly polarized light that is entered from the diffusion-region-1_B side to the first linearly polarized light (TM polarized light or P-polarized light) or the second linearly polarized light (TE polarized light or S-polarized light) according to the direction of rotation of the circularly polarized light.

Of the entered light, polarizing layer 13 transmits the first linearly polarized light (TM polarized light or P-polarized light) and reflects the second linearly polarized light (TE polarized light or S-polarized light).

The thickness of fluorescent light reflecting layer 11 is within the range from 30 μm to 300 μm, and preferably within the range from 30 μm to 60 μm. The thickness of phase difference layer 12 is within the range from 30 μm to 300 μm, and preferably within the range from 50 μm to 100 μm. The thickness of polarizing layer 13 is within the range from 15 μm to 500 μm, and preferably within the range from 100 μm to 200 μm.

The action of reflecting means 10 of the fluorescent screen of the present exemplary embodiment is next described.

Figure 2:
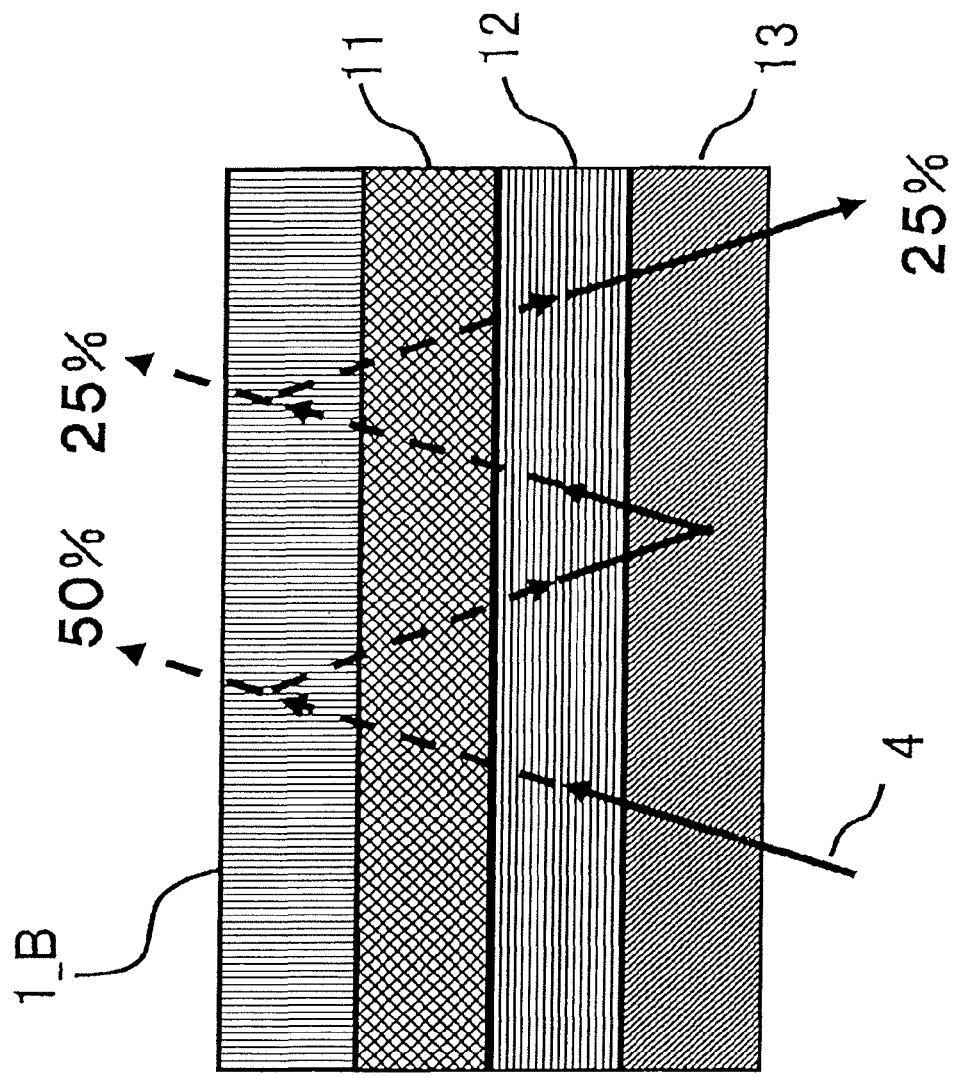
FIG. 2 is a schematic view for describing the action of the reflecting means in the diffusion region of the fluorescent screen shown in FIG. 1.

FIG. 2 is a schematic view for describing the action of reflecting means 10 in diffusion region 1_B. In FIG. 2, the arrows shown by broken lines show circularly polarized light, and the arrows shown by solid lines show linearly polarized light (first or second linearly polarized light).

As shown in FIG. 2, excited light 4 that is the first linearly polarized light (TM polarized light or P-polarized light) is irradiated into the surface on the reflecting-means-10 side of the fluorescent screen.

Excited light 4 is successively transmitted through polarizing layer 13, phase difference layer 12, and fluorescent light reflecting layer 11. Excited light 4 that has been transmitted through polarizing layer 13, in the process of being transmitted through phase difference layer 12, is converted from first linearly polarized light to circularly polarized light. Circularly polarized excited light 4 is transmitted without alteration through fluorescent light reflecting layer 11 and entered into diffusion region 1_B.

In diffusion region 1_B, circularly polarized excited light 4 is diffused, and of the diffused light, approximately 50% of the light is exited in the direction of the base-material-2 side, and the remaining light is exited toward the fluorescent-light-reflecting-layer-11 side.

The diffused light (circularly polarized light) that is exited from diffusion region 1_B in the direction of the fluorescent-light-reflecting-layer-11 side is successively transmitted through fluorescent light reflecting layer 11 and phase difference layer 12 and then entered into polarizing layer 13.

The diffused light (circularly polarized light) that is transmitted through fluorescent light reflecting layer 11, in the process of being transmitted through phase difference layer 12, is converted from circularly polarized light to second linearly polarized light (TE polarized light or S-polarized light). Polarizing layer 13 reflects the diffused light of the second linearly polarized light from phase difference layer 12 in the direction of the phase difference-layer-12 side.

The reflected light of the second linearly polarized light that was reflected by polarizing layer 13 is successively transmitted through phase difference layer 12 and fluorescent light reflecting layer 11. The reflected light of the second linearly polarized light from polarizing layer 13, in the process of being transmitted through phase difference layer 12, is converted from second linearly polarized light to circularly polarized light. The reflected light of the circularly polarized light is transmitted without alteration through fluorescent light reflecting layer 11 and entered into diffusion region 1_B.

In diffusion region 1_B, the reflected light of circularly polarized light is diffused, and of this diffused light, approximately 50% of the light is exited in the direction of the base-material-2 side, and the remaining light is exited toward the fluorescent-light-reflecting-layer-11 side. Here, the reflected light of the circularly polarized light that was entered into diffusion region 1_B corresponds to approximately 25% of previously described circularly polarized excited light 4 that was entered into diffusion region 1_B.

The diffused light (circularly polarized light) that was exited in the direction of the fluorescent-light-reflecting-layer-11 side from diffusion region 1_B is successively transmitted through fluorescent light reflecting layer 11 and phase difference layer 12 and then entered into polarizing layer 13.

The diffused light (circularly polarized light) that was transmitted through fluorescent light reflecting layer 11, in the process of being transmitted through phase difference layer 12, is converted from circularly polarized light to first linearly polarized light (TM polarized light or P-polarized light). Polarizing layer 13 transmits the diffused light of the first linearly polarized light from phase difference layer 12. Here, the diffused light of the first linearly polarized light that is transmitted through polarizing layer 13 corresponds to approximately 25% of previously described circularly polarized excited light 4 that was entered into diffusion region 1_B.

As described hereinabove, according to the fluorescent screen of the present exemplary embodiment, in diffusion region 1_B, diffused excited light 4 is exited in the two directions of the front-surface side (base-material-2 side) and the rear-surface side (fluorescent-light-reflecting-layer-11 side), but approximately 50% of the diffused light that was exited in the direction of the rear-surface side is reflected in the direction of the front-surface side by means of reflecting means 10.

If T is the light-extracting efficiency (light utilization efficiency), which is the proportion of light that is extracted from the front-surface side of diffusion region 1_B as the diffused light of excited light 4, then T is expressed by means of the following formula:

$$T = \frac{1}{2} + \left(\frac{1}{2} \times \frac{1}{2}\right) = 75\% \qquad \text{[Formula 1]}$$

According to the above-described formula, 75% of the light of excited light 4 that is entered into diffusion region 1_B can theoretically be extracted from the front-surface side as diffused light.

In contrast, in a device that lacks phase difference layer 12 and polarizing layer 13, the light extraction efficiency T is:

$$T = \frac{1}{2} = 50\% \qquad \text{[Formula 2]}$$

whereby only 50% of the light of excited light 4 that is entered into diffusion region 1_B can theoretically be extracted from the front-surface side as diffused light.

Thus, according to the fluorescent screen of the present exemplary embodiment, the luminance of blue diffused light that is observed from the front-surface side is increased by approximately 1.5 times compared to a device that lacks phase difference layer 12 and polarizing layer 13.

In phosphor regions 1_R and 1_G, moreover, phosphor absorbs circularly polarized excited light 4 that is transmitted through reflecting means 10 and releases fluorescent light. The diffused light of the fluorescent light that is released is exited toward the front-surface side (the side of base material 2) and the rear-surface side (the side of fluorescent light reflecting layer 11), but most of the diffused fluorescent light that is exited toward the rear-surface side is reflected in the direction of the front-surface side by fluorescent light reflecting layer 11. Accordingly, almost all of the diffused fluorescent light can be extracted from the front-surface side.

As described hereinabove, almost all of the diffused light of the red and green fluorescent light that is emitted from phosphor regions 1_R and 1_G can be extracted from the front-surface side, and in addition, approximately 75% of the light of excited light 4 that is entered into diffusion region 1_B can be extracted from the front-surface side as diffused light, whereby images of greater luminance can be provided.

The fluorescent screen of the present exemplary embodiment is only one example of the present invention, and the configuration of this exemplary embodiment can be modified within a range that does not depart from the gist of the present invention that will be clear to any one of ordinary skill in the art.

For example, reflecting means 10 may be a construction in which phase difference layer 12, polarizing layer 13, and fluorescent light reflecting layer 11 are successively deposited from the base-material-2 side.

The phosphor regions that are formed on base material 2 are not limited to phosphor regions that emit red and green fluorescent light. As the phosphor regions, regions that emit fluorescent light of other colors may be added, and the phosphor regions may be constituted only by regions that emit fluorescent light of a specific color.

Second Exemplary Embodiment

Figure 3:
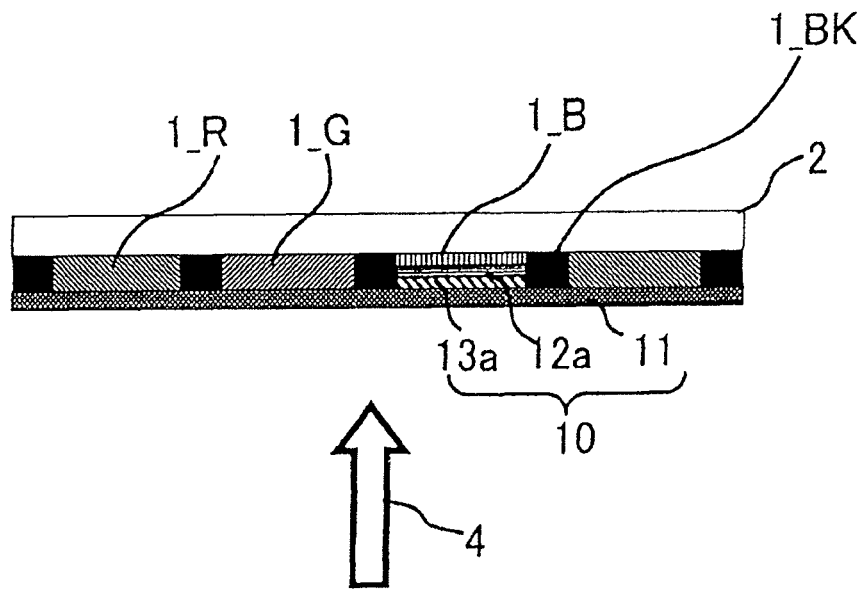
FIG. 3 is a schematic sectional view showing the cross-section construction of a portion of the fluorescent screen that is the second exemplary embodiment of the present invention.

FIG. 3 is a schematic sectional view that shows the cross-section construction of a portion of the fluorescent screen that is the second exemplary embodiment of the present invention.

The fluorescent screen of the present exemplary embodiment is the same as that of the first exemplary embodiment with the exception of a difference in the portion of the reflecting means 10.

Reflecting means 10 includes fluorescent light reflecting layer 11, phase difference layer 12a, and polarizing layer 13a. Fluorescent light reflecting layer 11 is the same as in the first exemplary embodiment.

Phase difference layer 12a is formed on diffusion region 1_B, and polarizing layer 13a is formed on phase difference layer 12a. In other words, diffusion region 1_B, phase difference layer 12a, and polarizing layer 13a are deposited in that order from the base-material-2 side in regions that are partitioned by black stripes 1_BK. The thickness of the entire stacking portion substantially matches the thickness of phosphor regions 1_R and 1_G.

Fluorescent light reflecting layer 11 is provided on the entire surface in which are formed: phosphor regions 1_R and 1_G, black stripes 1_BK, and the stacking portions of diffusion region 1_B, phase difference layer 12a, and polarizing layer 13a.

Figure 4:
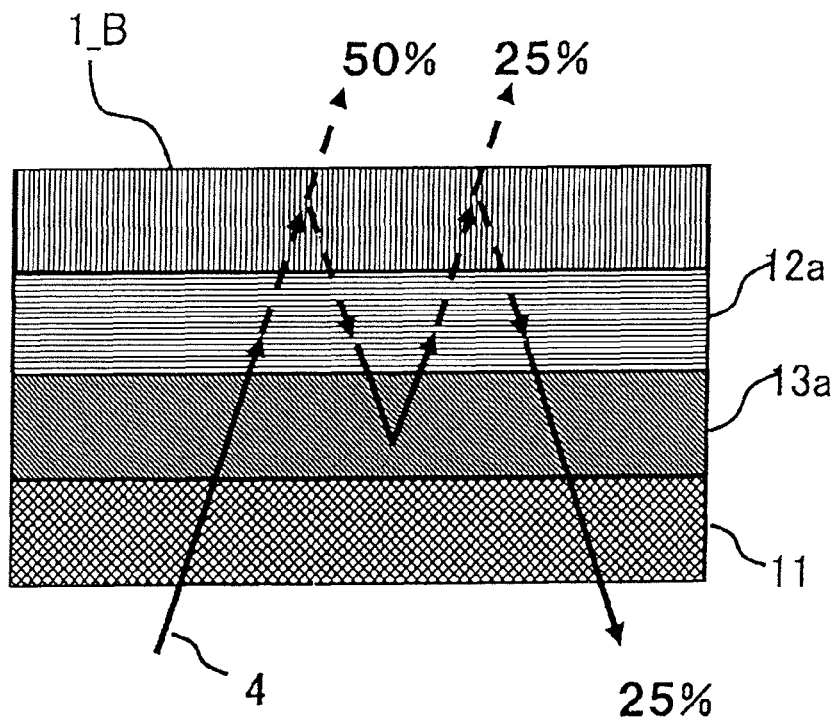
FIG. 4 is a schematic view for describing the action of the reflecting means in the diffusion region of the fluorescent screen shown in FIG. 3.

FIG. 4 is a schematic view for describing the action of reflecting means 10 in diffusion region 1_B. In FIG. 4, arrows shown with broken lines indicate circularly polarized light, and arrows shown with solid lines indicate linearly polarized light (first or second linearly polarized light).

As shown in FIG. 4, excited light 4 that is the first linearly polarized light (TM polarized light or P-polarized light) is irradiated into the surface on the side of reflecting means 10 of the fluorescent screen.

Excited light 4 is successively transmitted through fluorescent light reflecting layer 11, polarizing layer 13a, and phase difference layer 12a. Excited light 4 that is transmitted through polarizing layer 13, in the process of being transmitted through phase difference layer 12a, is converted from the first linearly polarized light to circularly polarized light. The circularly polarized excited light 4 that is transmitted through phase difference layer 12a is entered into diffusion region 1_B.

In diffusion region 1_B, circularly polarized excited light 4 is diffused, and of this diffused light, approximately 50% of the light is exited in the direction of the base-material-2 side, and the remaining light is exited toward the phase difference-layer-12a side.

The diffused light (circularly polarized light) that is exited from diffusion region 1_B in the direction of the phase difference-layer-12a side, after being transmitted through phase difference layer 12a, is entered into polarizing layer 13a. The diffused light (circularly polarized light) from diffusion region 1_B, in the process of being transmitted through phase difference layer 12a, is converted from circularly polarized light to the second linearly polarized light. Polarizing layer 13a reflects the diffused light of the second linearly polarized light from phase difference layer 12a in the direction of the phase difference-layer-12a side.

The reflected light of the second linearly polarized light that was reflected by polarizing layer 13a, after being transmitted through phase difference layer 12a, is entered into diffusion region 1_B. The reflected light of the second linearly polarized light from polarizing layer 13a, in the process of being transmitted through phase difference layer 12a, is converted from the second linearly polarized light to circularly polarized light. The reflected light of the circularly polarized light is entered into diffusion region 1_B.

In diffusion region 1_B, the reflected light of the circularly polarized light is diffused, and of the diffused light, approximately 50% is exited in the direction of the base-material-2 side, and the remaining light is exited toward the phase difference-layer-12a side. Here, the reflected light of the circularly polarized light that was entered into diffusion region 1_B corresponds to approximately 25% of the light of the above-described circularly polarized excited light 4 that was entered into diffusion region 1_B.

The diffused light (circularly polarized light) that is exited from diffusion region 1_B in the direction of phase difference layer 12a, after having been successively transmitted through phase difference layer 12a, is entered into polarizing layer 13a. The diffused light (circularly polarized light) from diffusion region 1_B, in the process of being transmitted through phase difference layer 12a, is converted from circularly polarized light to the first linearly polarized light. Polarizing layer 13a transmits the diffused light of the first linearly polarized light from phase difference layer 12a without alteration.

The diffused light of the first linearly polarized light that is transmitted through polarizing layer 13a is entered into fluorescent light reflecting layer 11. Fluorescent light reflecting layer 11 transmits the diffused light of the first linearly polarized light from polarizing layer 13a without alteration. Here, the diffused light of the first linearly polarized light that is transmitted through fluorescent light reflecting layer 11 corresponds to about 25% of the light of the above-described circularly polarized excited light 4 that was entered into diffusion region 1_B.

As described hereinabove, in diffusion region 1_B, diffused excited light 4 is exited in two directions: toward the front-surface side (the base-material-2 side) and toward the rear-surface side (the fluorescent-light-reflecting-layer-11 side), but approximately 50% of the light of the diffused light that was exited toward the rear-surface side is reflected in the direction of the front-surface side by reflecting means 10. As a result, as in the first exemplary embodiment, the fluorescent screen of the present exemplary embodiment allows the luminance of blue diffused light that is observed from the front-surface side to be increased by approximately 1.5 times compared to a device that lacks phase difference layer 12a and polarizing layer 13a.

In addition, in phosphor regions 1_R and 1_G, phosphor absorbs the circularly polarized excited light 4 that is transmitted through reflecting means 10 to release fluorescent light, and the diffused fluorescent light that is released is exited in both the direction of the front-surface side (the base-material-2 side) and the rear-surface side (the fluorescent-light-reflecting-layer-11 side). Almost all of the diffused light of the fluorescent light that was exited toward the rear-surface side is reflected in the direction of the front-surface side by fluorescent light reflecting layer 11. Accordingly, almost all of the diffused fluorescent light can be extracted from the front-surface side.

As described hereinabove, almost all of the diffused light of the red and green fluorescent light that is emitted from phosphor regions 1_R and 1_G can be extracted from the front-surface side, and in addition, approximately 75% of the light of excited light 4 that was entered into diffusion region 1_B can be extracted from the front-surface side, whereby high-luminance images can be provided.

In addition, in the device of the first exemplary embodiment, phase difference layer 12a and polarizing layer 13a are formed not only on diffusion region 1_B but also on phosphor regions 1_R and 1_G. However, the portions of phase difference layer 12a and polarizing layer 13a that are formed on phosphor regions 1_R and 1_G do not act in any way upon fluorescent light and are therefore unnecessary. In contrast, according to the present exemplary embodiment, phase difference layer 12a and polarizing layer 13a are formed only on diffusion region 1_B. Thus, phase difference layer 12a and polarizing layer 13a need not be formed on phosphor regions 1_R and 1_G, whereby the thickness of the screen can be decreased and costs can also be reduced.

In the fluorescent screen of the present exemplary embodiment, fluorescent light reflecting layer 11 may be formed only on phosphor regions 1_R and 1_G.

Third Exemplary Embodiment

Figure 5:
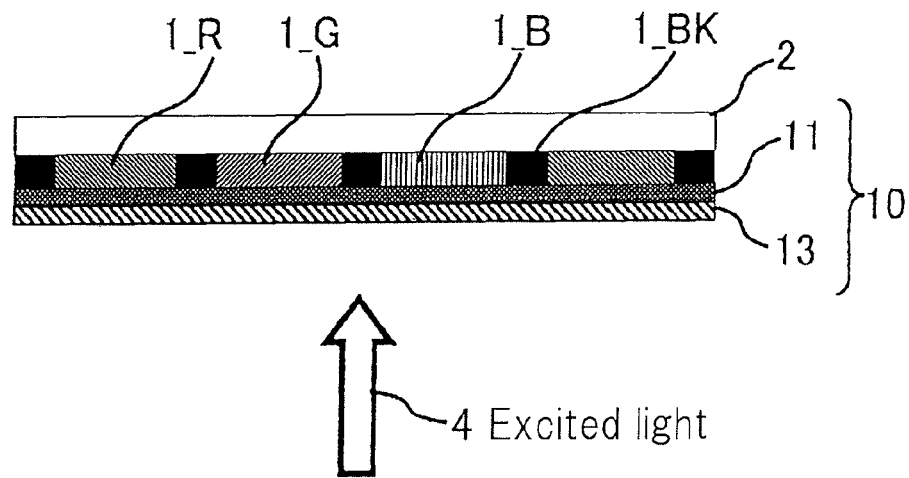
FIG. 5 is a schematic sectional view that shows the cross-section construction of a portion of the fluorescent screen that is the third exemplary embodiment of the present invention.

FIG. 5 is a schematic sectional view showing the cross-section construction of a portion of the fluorescent screen that is the third exemplary embodiment of the present invention.

The fluorescent screen of the present exemplary embodiment is the same as that of the first exemplary embodiment with the exception of differences in a portion of diffusion region 1_B and reflecting means 10.

Diffusion region 1_B is composed of a diffusion material that does not maintain polarization. Examples of materials used as this diffusion material include inorganic particles such as calcium carbonate and barium sulfate, organic particles such as polymethyl methacrylate (PMMA) and polystyrene (PS). Diffusion region 1_B is formed by applying a mixture of this type of diffusion material and a binder such as acryl resin to the desired regions of base material 2 and then thermosetting or photosetting.

Reflecting means 10 includes fluorescent light reflecting layer 11 and polarizing layer 13 but differs from reflecting means 10 of the first exemplary embodiment in that it lacks phase difference layer 12. Fluorescent light reflecting layer 11 and polarizing layer 13 are the same as in the first exemplary embodiment.

Figure 6:
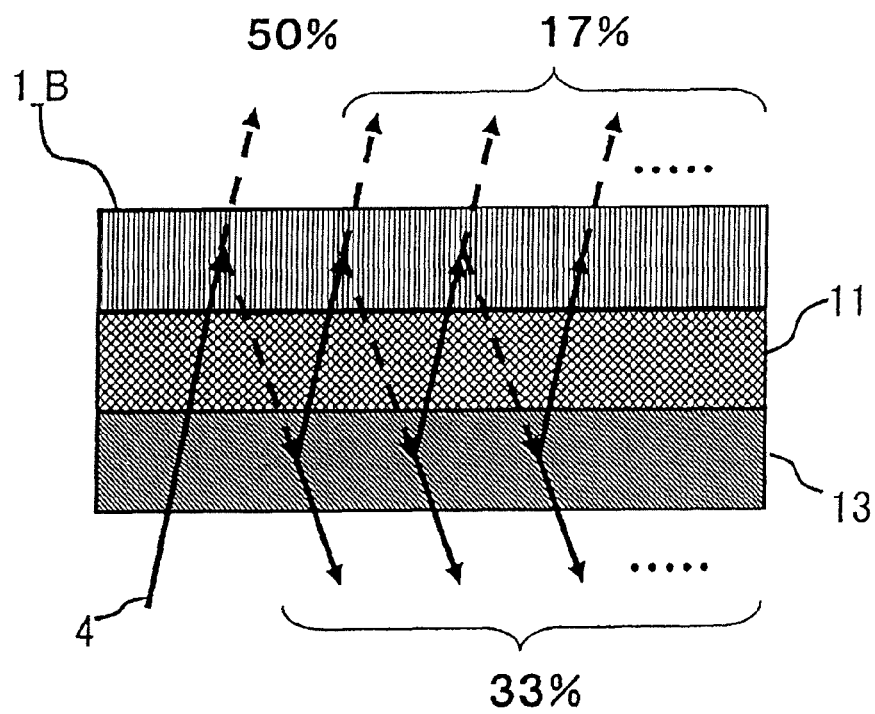
FIG. 6 is a schematic view for describing the action of the reflecting means in the diffusion region of the fluorescent screen shown in FIG. 5.

FIG. 6 is a schematic view for describing the action of reflecting means 10 in diffusion region 1_B. In FIG. 6, arrows shown with broken lines indicate randomly polarized light, and arrows shown with solid lines indicate linearly polarized light (first or second linearly polarized light).

As shown in FIG. 6, excited light 4 that is the first linearly polarized light (TM polarized light or P-polarized light) is irradiated into the surface of the reflecting-means-10 side of the fluorescent screen.

Excited light 4 is successively transmitted through polarizing layer 13 and fluorescent light reflecting layer 11 and then entered into diffusion region 1_B. In diffusion region 1_B, excited light 4 that is entered is diffused, and the diffused randomly polarized light is exited both toward the front-surface side and the rear-surface side.

Diffused light of the randomly polarized light that is exited from diffusion region 1_B in the direction of the rear-surface side is transmitted through fluorescent light reflecting layer 11 and entered into polarizing layer 13. Polarizing layer 13 transmits, of the diffused randomly polarized light from diffusion region 1_B, the first linearly polarized light without alteration but reflects the second linearly polarized light in the direction of the diffusion-region-1_B side.

The reflected light of the second linearly polarized light from polarizing layer 13 is transmitted through fluorescent light reflecting layer 11 and entered into diffusion region 1_B. In diffusion region 1_B, the entered reflected light of the second linearly polarized light is diffused, and the diffused light of the randomly polarized light is exited both toward the front-surface side and the rear-surface side. The process of diffusing the second linearly polarized light in diffusion region 1_B and the processes of transmitting the first linearly polarized light and reflecting the second linearly polarized light in polarizing layer 13 are subsequently repeated.

If T is, of excited light 4, the proportion of light that is extracted from the front-surface side of diffusion region 1_B (the light extraction efficiency) by means of the above-described action of reflecting means 10, then T is expressed by the following geometric series formula:

$$T = \frac{1}{2} + \frac{1}{2} \times \left(\frac{1}{2}\right)^2 + \frac{1}{2} \times \left(\frac{1}{2}\right)^4 + \ldots = 67\%$$ [Formula 3]

According to the formula above, the light of 67% of excited light 4 that is entered into diffusion region 1_B can theoretically be extracted from the front-surface side as diffused light.

In contrast, the light extraction efficiency T is 50% in the case of a device that lacks phase difference layer 12 and polarizing layer 13. As a result, according to the fluorescent screen of the present exemplary embodiment, the luminance of blue diffused light that is observed from the front-surface side is increased by approximately 1.3 times compared to a device that lacks phase difference layer 12 and polarizing layer 13.

In phosphor regions 1_R and 1_G, fluorescent material absorbs excited light 4 that is transmitted through reflecting means 10 to release fluorescent light. The diffused fluorescent light that is released is exited toward the front-surface side (base-material-2 side) and the rear-surface side (fluorescent-light-reflecting-layer-11 side), but almost all of the diffused fluorescent light that is exited toward the rear-surface side is reflected in the direction of the front-surface side by fluorescent light reflecting layer 11. Accordingly, almost all of the diffused fluorescent light can be extracted from the front-surface side.

As described hereinabove, almost all of the diffused light of the red and green fluorescent light that is emitted from phosphor regions 1_R and 1_G can be extracted from the front-surface side, and approximately 67% of excited light 4 that is entered into diffusion region 1_B can be extracted from the front-surface side as diffused light, whereby images of high luminance can be provided.

In addition, the fluorescent screen of the present exemplary embodiment lacks phase difference layer 12, and as a result, compared to the fluorescent screen of the first exemplary embodiment, the fluorescent screen can be made slimmer, and moreover, the number of fabrication steps can be decreased and costs can be reduced.

Reflecting means 10 may also be a construction in which polarizing layer 13 and fluorescent light reflecting layer 11 are successively deposited from the base-material-2 side.

Fourth Exemplary Embodiment

Figure 7:
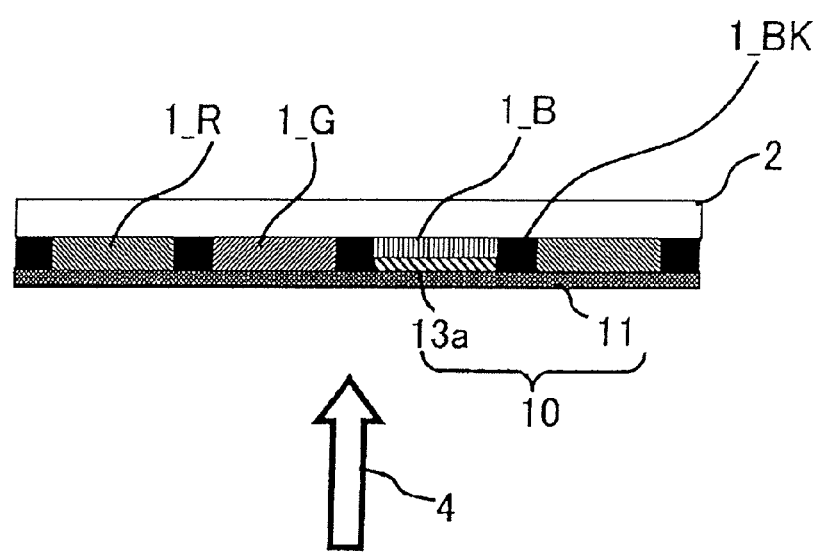
FIG. 7 is a sectional view that shows the cross-section construction of a portion of the fluorescent screen that is the fourth exemplary embodiment of the present invention.

FIG. 7 is a schematic sectional view showing the cross-section construction of a portion of the fluorescent screen that is the fourth exemplary embodiment of the present invention.

The fluorescent screen of the present exemplary embodiment is the same as that of the second exemplary embodiment with the exception of differences in portions of diffusion region 1_B and reflecting means 10.

Diffusion region 1_B is the same as in the third exemplary embodiment. Reflecting means 10 also includes fluorescent light reflecting layer 11 and polarizing layer 13a but differs from the second exemplary embodiment in that it lacks phase difference layer 12. Fluorescent light reflecting layer 11 and polarizing layer 13a are the same as in the second exemplary embodiment.

The fluorescent screen of the present exemplary embodiment can also obtain the same action and effects as the fluorescent screen of the third exemplary embodiment.

In the fluorescent screen of the present exemplary embodiment, fluorescent light reflecting layer 11 may be formed only on phosphor regions 1_R and 1_G.

Fifth Exemplary Embodiment

FIG. 8 is a schematic sectional view showing the cross-section construction of a portion of the fluorescent screen that is the fifth exemplary embodiment of the present invention.

The fluorescent screen of the present exemplary embodiment is the same as the fluorescent screen of the second exemplary embodiment with the exception of a difference in the portion of reflecting means 10.

Reflecting means 10 includes fluorescent light reflecting layer 11a, phase difference layer 12a, and polarizing layer 13a. Phase difference layer 12a and polarizing layer 13a are the same as in the second exemplary embodiment and are formed on diffusion region 1_B. Fluorescent light reflecting layer 11a is formed on phosphor regions 1_R and 1_G.

To describe more specifically, a stacking portion in which phosphor region 1_R and fluorescent light reflecting layer 11a are successively deposited in that order from the base-material-2 side, a stacking portion in which phosphor region 1_G and fluorescent light reflecting layer 11a are successively deposited in that order from the base-material-2 side, and a stacking portion in which diffusion region 1_B, phase difference layer 12a, and polarizing layer 13a are successively deposited in that order from the base-material-2 side are partitioned by black stripes 1_BK. The thickness of each stacking portion is substantially equal.

The fluorescent screen of the present exemplary embodiment can also obtain the same action and effects as the fluorescent screen of the second exemplary embodiment.

In the fluorescent screen of the present exemplary embodiment, phase difference layer 12 may be eliminated, and diffusion region 1_B may be composed of the diffusion material that was described in the third exemplary embodiment.

In the fluorescent screens of each of the above-described exemplary embodiments, excited light 4 may be used as the second linearly polarized light (TE polarized light or S-polarized light). In such cases, polarizing layers 13 and 13a have characteristics whereby the second linearly polarized light (TE polarized light or S-polarized light) is transmitted and the first linearly polarized light (TM polarized light or P-polarized light) is reflected.

The fluorescent screen of the present invention described hereinabove can be generally applied to rear-projection-type image display devices.

An image display device that is equipped with the fluorescent screen of the present invention is next described.

FIG. 9 shows an example of an image display device that is equipped with a fluorescent screen of the present invention.

Referring to FIG. 9, the image display device is a rear-projection-type device and includes control unit 20, excitation light source 21, scanning unit 22, and fluorescent screen 24.

Fluorescent screen 24 is configured from any of the fluorescent screens of the above-described exemplary embodiments.

Excitation light source 21, which is, for example, a laser light source that is typified by a laser diode (LD), supplies excited light that is the first linearly polarized light (TM polarized light or P-polarized light) or the second linearly polarized light (TE polarized light or S-polarized light). The setting of the excited light to either the first or second linearly polarized light is determined by the configuration of the fluorescent screen (the characteristics of the polarizing layer).

Scanning unit 22 scans the surface on the reflecting-means-10 side of fluorescent screen 24 with a light beam (excited light 4 shown in, for example, FIG. 1) from excitation light source 21 as shown by wave-shaped scanning track 23a.

Scanning unit 22 is made up by a polygonal mirror, a Galvanometer mirror, or a resonance MEMS (Micro Electro Mechanical Systems) mirror. Scanning unit 22 may be a biaxial scanning element that is capable of bi-directional scanning in the horizontal and vertical directions, or may be a configuration in which two elements, a scanning element that scans the horizontal direction and a scanning element that scans the vertical direction, are combined.

According to scanning track 23a, the excited light scans in the horizontal direction and reverses the scanning direction at the left and right edges of fluorescent screen 24. Scanning in the vertical direction at the same time as this scanning in the horizontal direction enables two-dimensional scanning of fluorescent screen 24.

Control unit 20 controls the operation of scanning unit 22 and excitation light source 21 based on video signal S that is received as input from an external device. The external device is a picture signal supply device of which, for example, a personal computer is representative.

When excitation light source 21 is of a configuration that supplies excited light that is randomly polarized light, a polarization conversion element that converts the excited light to the first or second linearly polarized light may be provided on the optical path of the excited light that is exited from excitation light source 21.

Although the present invention has been described with reference to exemplary embodiments, the present invention is not limited to the above-described exemplary embodiments. The configuration and operation of the present invention are open to various modifications within a scope that does not depart from the gist of the present invention that will be clear to any one of ordinary skill in the art.

This application claims the benefits of priority based on Japanese Patent Application No. 2011-136178 for which application was submitted on Jun. 20, 2011 and incorporates by citation all of the disclosures of that application.

What is claimed is:

1. A fluorescent screen comprising:
   phosphor regions that contain fluorescent material that absorbs first linearly polarized light and emits fluorescent light;
   a diffusion region that diffuses said first linearly polarized light; and
   a polarizing layer that is arranged on the side of said diffusion regions into which said first linearly polarized light is entered,
   wherein said polarizing layer transmits said first linearly polarized light and reflects second linearly polarized light whose vibrational direction differs from that of said first linearly polarized light.

2. The fluorescent screen as set forth in claim 1, further comprising a fluorescent light reflecting layer that transmits said first linearly polarized light to irradiate said phosphor regions, and that reflects, toward said phosphor region side, said fluorescent light that was emitted in said phosphor regions by the irradiation of said first linearly polarized light.

3. The fluorescent screen as set forth in claim 2, wherein said fluorescent light reflecting layer is formed on a region that includes said phosphor regions and diffusion region, and said polarizing layer is formed on said fluorescent light reflecting layer.

4. The fluorescent screen as set forth in claim 2, wherein said polarizing layer is formed on said diffusion region and said fluorescent light reflecting layer is formed on said phosphor regions and regions that include the polarizing layer.

5. The fluorescent screen as set forth in claim 4, wherein stacking portions of said polarizing layer and diffusion region and said phosphor regions are partitioned by black stripes that absorb said excited light and fluorescent light.

6. The fluorescent screen as set forth in claim 2, wherein said fluorescent light reflecting layer is formed on said phosphor regions, and said polarizing layer is formed on said diffusion region.

7. The fluorescent screen as set forth in claim 6, wherein stacking portions of said diffusion region and polarizing layer and stacking portions of said phosphor regions and fluorescent light reflecting layer are partitioned by black stripes that absorb said excited light and fluorescent light.

8. The fluorescent screen as set forth in claim 2, wherein said polarizing layer is formed on a region that includes said phosphor regions and diffusion region, and said fluorescent light reflecting layer is formed on said polarizing layer.

9. The fluorescent screen as set forth in claim 1, further comprising a phase difference layer that is provided between said diffusion region and said polarizing layer, that converts each of said first and second linearly polarized light that is entered from said polarizing layer side to circularly polarized light, and that converts circularly polarized light that is entered from said diffusion region side to said first or second linearly polarized light according to the direction of rotation.

10. An image display device comprising:
    the fluorescent screen as set forth in claim 1;
    an excitation light source that supplies first linearly polarized light; and
    a scanning unit that scans one surface of said fluorescent screen with said first linearly polarized light that is supplied from said excitation light source.

* * * * *